(12) United States Patent
Ogura

(10) Patent No.: US 7,356,003 B2
(45) Date of Patent: Apr. 8, 2008

(54) RADIO COMMUNICATION SYSTEM AND ITS MOBILE COMMUNICATION TERMINAL

(75) Inventor: Miyuki Ogura, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 407 days.

(21) Appl. No.: 11/089,911

(22) Filed: Mar. 24, 2005

(65) Prior Publication Data
US 2006/0176844 A1 Aug. 10, 2006

(30) Foreign Application Priority Data
Feb. 7, 2005 (JP) ............... 2005-030459

(51) Int. Cl.
*H04Q 7/00* (2006.01)
(52) U.S. Cl. ............ 370/332; 370/335; 455/437; 455/453
(58) Field of Classification Search ........ 370/331–334; 455/436–442
See application file for complete search history.

(56) References Cited

U.S. PATENT DOCUMENTS 5,903,840 A * 5/1999 Bertacchi ............... 455/436

2003/0002460 A1 * 1/2003 English ............... 370/331

FOREIGN PATENT DOCUMENTS

| JP | 61-032627 A | 2/1986 |
|----|---|---|
| JP | 05-327598 A | 12/1993 |
| JP | 2000-50337 A | 2/2000 |
| JP | 2000-138973 A | 5/2000 |
| JP | 2002-58063 A | 2/2002 |
| JP | 2003-092782 A | 3/2003 |

* cited by examiner

*Primary Examiner*—Temica Beamer
(74) *Attorney, Agent, or Firm*—Frishauf, Holtz, Goodman & Chick, P.C.

(57) ABSTRACT

When deterioration in throughput is detected, it is determined whether a factor of the deterioration is deterioration in channel quality or concentration of traffic. If the factor of the deterioration in the throughput is the concentration of the traffic, it is determined whether or not a base station to become a switching candidate for a serving sector is present around, and if it is present, switching of the serving sector is requested to a serving base station. In contrast, if the factor of the deterioration in the throughput is the deterioration in the channel quality, it is determined whether or not a base station to become an adding candidate for the serving sector is present around, and if it is present, adding of the serving sector is requested to the serving base station.

11 Claims, 4 Drawing Sheets

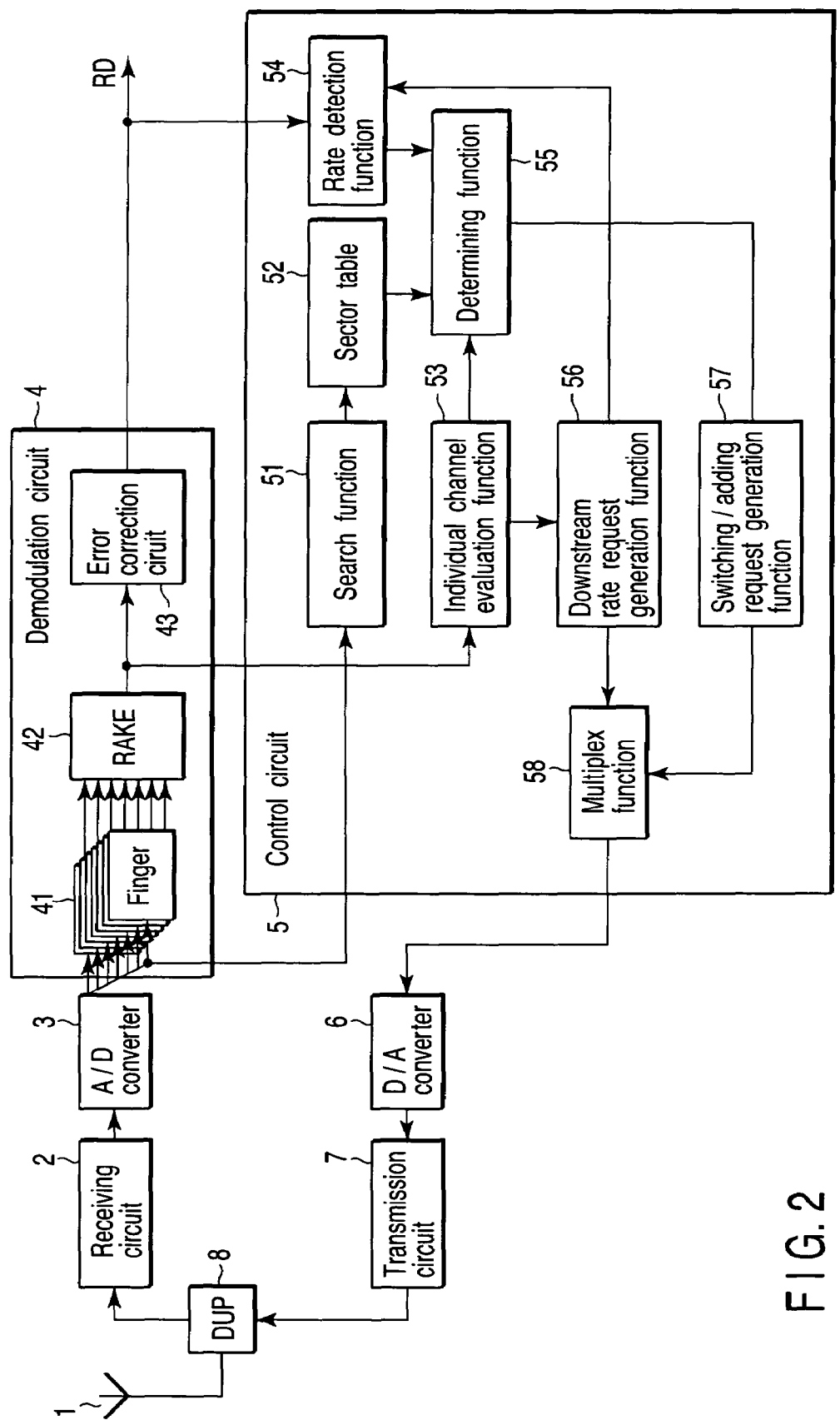
F I G. 2

RADIO COMMUNICATION SYSTEM AND ITS MOBILE COMMUNICATION TERMINAL

CROSS-REFERENCE TO RELATED APPLICATIONS

This application is based upon and claims the benefit of priority from prior Japanese Patent Application No. 2005-030459, filed Feb. 7, 2005, the entire contents of which are incorporated herein by reference.

BACKGROUND OF THE INVENTION

1. Field of the Invention

This invention relates to a radio communication system for make communication between a base station and a mobile communication terminal via a radio channel. More specifically, the present invention relates to a radio communication and its mobile communication terminal for adaptively controlling a transmission parameter in response to its channel quality for each mobile communication terminal.

2. Description of the Related Art

In a radio communication system, for example, a high-rate packet data (HRPD) system of CDMA 2000 is known as a scheme for adaptively controlling a transmission parameter in response to its channel quality. This system is used for an exclusive radio interface for a packet exchange network, and in a downstream radio channel from a base station to a mobile communication terminal, this system transmits packet data with time-division multiplexing by assigning a time slot to a plurality of mobile communication terminals, respectively.

The radio communication system with the HRPD system adopted therein adaptively controls average throughput to a specific mobile communication terminal in response to a channel quality of each radio channel. This control is achieved, for example, as follows. That is, the mobile communication terminal measures the channel quality used between the communication terminal and the base station. Then, the communication terminal decides a transmission format necessary for maintaining an error rate constant on the basis of the measurement result and the requests the decided transmission format to the base station. The base station transmits the packet data to the communication terminal by using the transmission format.

By the way, the downstream format considered in the HRPD system is decided by a combination of a plurality of transmission parameters such as a data rate, a packet size, a modulation system and an encoding rate. Accordingly, it is needed to select a combination of a high data rate and a high-efficiency modulation system in order to obtain high throughput. However, in a radio communication system with the general HRPD system adapted therein, a transmission format capable of achieving the high throughput is selected when a signal interface noise ratio (SINR) of the ratio channel measured by the communication terminal is good. In contrast, when the SINR is decreased, a transmission format excellent in interference resistant characteristics is selected so as to maintain the error rate to the channel quality at a prescribed value or more. Therefore, the average throughput is decreased under an environment with a poor channel quality as such case that the mobile communication terminal is located, for example, in the vicinity of a cell boundary between base stations.

Consequently, for example, as described in Jpn. Pat. Appln. KOKAI Publication No. 2002-58063, a technique is proposed conventionally to increase transmission power of a downstream radio channel for the communication terminal located in the vicinity of the cell boundary in a time zone preset so as not to be overlapped with an adjacent base station. According to this technique, it becomes possible to improve a ratio of carrier wave power/interference wave (C/I) of the communication terminal located in the vicinity of the cell boundary and enhance its throughput.

Although, the conventional technique described above is effective in the case that the decrease in the throughput of the communication terminal results from the location of the communication terminal in an area with a low SINR, however, the effect cannot be expected if the decrease in the throughput is resulted from a factor other than the decrease of the SINR, for example, a factor of concentration of traffic.

BRIEF SUMMARY OF THE INVENTION

An object of the invention is to enable always selecting an appropriate measure for a throughput improvement in response to a factor of decrease in throughput, and thereby, provide a radio communication system and its mobile communication terminal capable of holding the throughput in high.

To achieve the object, in a radio communication system equipped with a plurality of base stations forming each serving area and with a mobile station making radio communication with the base stations via radio channels in the serving areas, the communication terminal detects deterioration in throughput of the corresponding radio communication during the radio communication with the base stations and determines whether the factor of the deterioration in throughput is resulted from the deterioration in channel quality or from a concentration of traffic when the deterioration in throughput is detected. Then, based on the result of the determination of the factor of the deterioration in throughput, a request for a throughput improvement prepared in advance by associating with the case of the deterioration is transmitted to the base stations. On the other hand, the base stations receive the request for the throughput improvement transmitted from the mobile stations and execute the measure to improve the throughput of the radio communication between the mobile station in response to the received request for the throughput improvement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a circuit block diagram showing an embodiment of a mobile communication terminal regarding the invention;

DETAILED DESCRIPTION OF THE INVENTION

Figure 1:
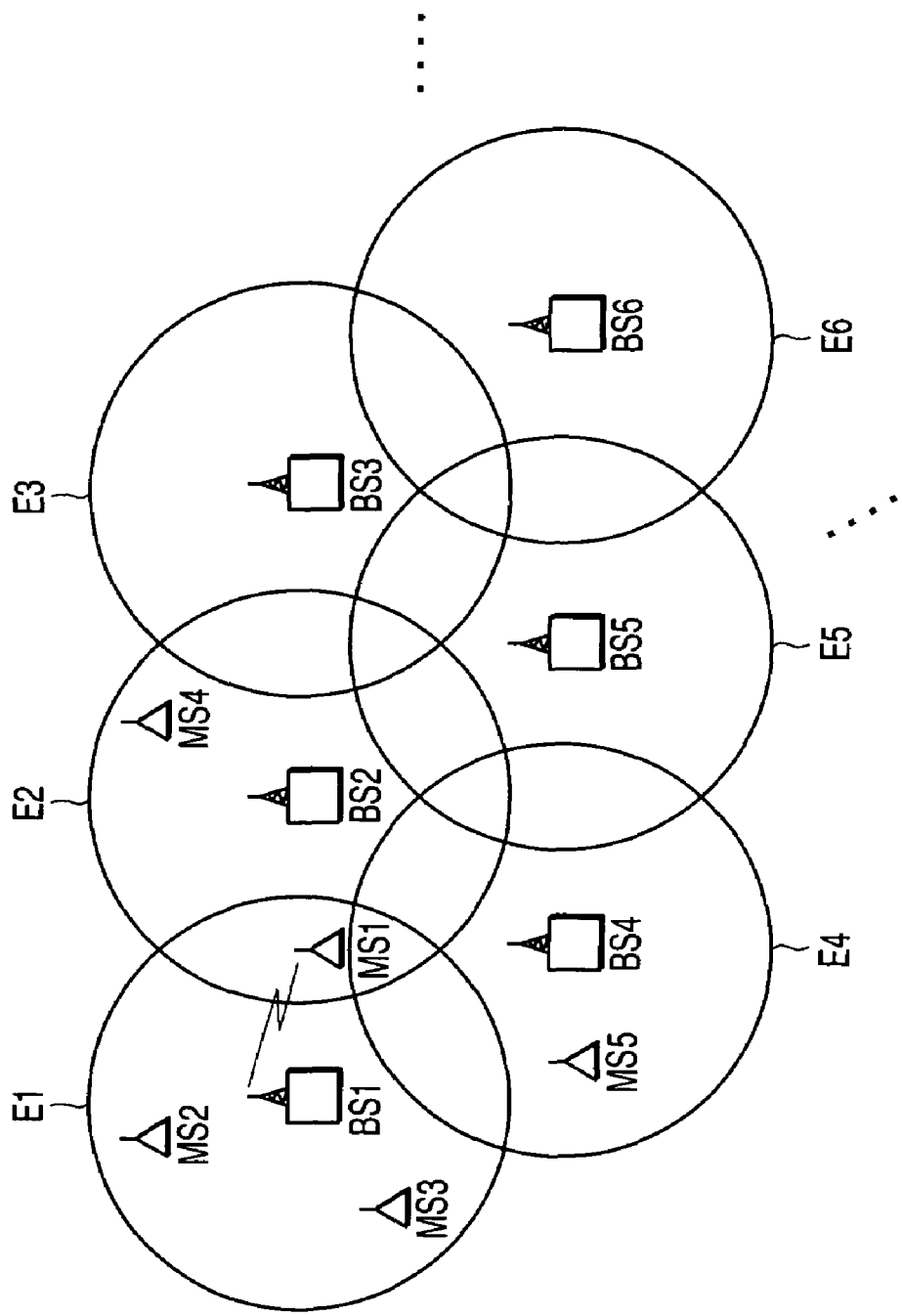
FIG. 1 is a schematic block diagram showing an embodiment of a radio communication system regarding the invention.

Hereinafter, embodiments of a radio communication system and its mobile communication terminal regarding the invention will be explained by referring to the drawings.

FIG. 1 is the schematic block diagram showing the embodiment of the radio communication system regarding the invention.

A plurality of base stations BS 1-BS 6 are distributed and disposed in service areas covered with the radio communication system. The base stations BS 1-BS 6 form radio areas E 1-E 7 referred to as cells, respectively. Mobile communication terminals MS 1-MS 5 establish synchronization with any one of the base stations BS 1-BS 6 in the radio areas E 1-E 6 and brought into a standby state. At this time, the base station being a synchronization establishing destination among the communication terminals MS 1-MS 5 is referred to as a serving base station and the radio area formed by the corresponding base station is referred to as a serving area or a serving sector. As for a radio access system between the base stations BS 1-BS 6 and the communication terminals MS 1-MS 5, for example, a system using a time-division multiple access (TDMA) system together with a code-division multiplex (CDM) system is used.

FIG. 2 is the block diagram showing main components of the mobile communication terminals MS 1-MS 5.

In FIG. 2, a spread spectrum signal transmitted from the base stations BS 1-BS 6 are input to a receiving circuit 2 through an antenna duplexer (DUP) 8 after being received by an antenna 1. The receiving circuit 2 down-converts the received spread spectrum signal into a receiving base-band signal by a frequency converter after amplifying the spread spectrum signal by a low noise amplifier. Then, the receiving circuit 2 inputs the base-band signal to an analog-to-digital (A/D) converter 3 after applying band limit to the base-band signal. The A/D converter 3 converts the input base-band signal into a digital signal by using a sampling clock set integer times of a chip rate and inputs the converted base-band signal to a demodulation circuit 4.

The demodulation circuit 4 is equipped with a plurality of finger circuits 41, a RAKE synthesizer 42 and an error correction circuit 43. The base-band signal includes a plurality of paths received from different transmission paths and the finger circuits 41 performing despreading of the paths by using a spread code, respectively. The RAKE synthesizer 42 make phases match with each dispreading path output from each finger circuit 41 and executes symbol synthesis. The error correction circuit 43 performs error correcting demodulation after executing de-interleave processing to the demodulated bit strings output from the RAKE synthesizer 42, and executes error check by cyclic redundancy check (CRC). The receiving data (RD) output from the error correction circuit 43 is input to a signal processing circuit (not shown), and the signal processing circuit performs audio demodulation processing and video demodulation processing for reproduction.

On the other hand, the transmitted spread spectrum signal output from a control circuit 5 is converted into an analogue signal by a digital-to-analog (D/A) converter 6, then, input to a transmission circuit 7. The transmission circuit 7 up-converts the input spectrum signal into a radio-frequency signal, and power-amplifies it to a prescribed transmission power level, then, supplies it to the antenna 1 through the DUP 8.

By the way, each mobile communication terminal in the embodiment is equipped with the control circuits 5. The control circuit 5 is composed of, for example, a digital signal processor (DSP) and a central processing unit (CPU). The control circuit 5 is composed of a search function 51, a sector table 52, an individual channel evaluation function 53, a rate detection function 54, a determining function 55, a downstream rate request generation function 56, a switching/adding request generation function 57 and a multiplex function 58. These functions 51-58 are respectively achieved by executing an application program by the CPU and the DSP.

The search function 51 respectively detects qualities of pilot signals transmitted from base stations BS 1-BS 5 around the radio areas in which the communication terminals MS 1-MS 5 are located. This detection is conducted in accordance with the base-band signal output from the A/D converter 3. The sector table 52 stores the qualities of the pilot signals detected by the search function 51 in association with identification information (base station ID).

The evaluation function 53 measures channel qualities of individual channels used for transmission of user information such as packet data when the communication terminal MS makes radio communication with the base station at the synchronization establishment destination, that is, the serving station. This measurement is conducted in accordance with demodulated bit strings output from the RAKE synthesizer 42.

The downstream rate request generation function 56 selects a transmission format suitable for performing a transmission in a downstream direction under channel qualities based on the channel qualities of the individual channels measured by the evaluation function 53. The generation function 56 converts the selected transmission format into a format necessary for notifying it to the serving base station and outputs the converted information, as the downstream request rate information, to the multiplex function 58.

The rate detection function 54 evaluates the difference between an actually measured value and a predicted value of the throughput in the downstream radio channel, and determines that the throughput has deteriorated if the transmission rate of the actually received data is smaller than the predicted value. The actually measured value of the throughput is obtained, for example, by acquiring receiving data RD output from the demodulation circuit 4 and counting the number of bits of the receiving data RD received for a prescribed time interval. Meanwhile, the predicted value of the throughput is obtained from downstream request rate information and transmission intervals thereof.

The determining function 55 determines the factor of the deterioration in the throughput, based on the channel qualities of the individual channels detected by the evaluation function 53 when the deterioration in the throughput is detected by the rate detection function 54. It is considered that the factor of the deterioration in the throughput is quality deterioration in the individual channels or the concentration of the traffic. The determining function 55 compares the detected channel qualities of the individual channels with a threshold value, and determines that the factor of the deterioration in the throughput is the deterioration in the channel qualities if the channel qualities are deteriorated not more than the threshold value. Otherwise, the determining function 55 determines that the factor of the deterioration in the throughput is the concentration of the traffic.

The determining function 55, furthermore, detects whether or not a base station to become a switching candidate or an additional candidate of the serving sector is present around. Then, the determining function 55 generates a request for channel control, based on the presence or absence of the base station to become the switching or the additional candidate of the serving sector and notifies the generated request for the channel control to the switching/adding request generation function 57.

The request generation function 57 converts the request for the channel control notified from the determining function 54 into a format necessary for transmission by using the radio control channel and outputs the converted channel control request information to the multiplex function 58.

The multiplex function 58 multiplexes the downstream rate information generated from the downstream rate request generation function 56 with the channel control request information generated from the switching/adding request generation function 57 and generates multiplexed control data. The generated control data is converted by a digital modulation system such as quadrature phase shift keying (QPSK) by a modulation function (not shown) and the spread spectrum having the spread code is produced. The modulated signal produced by the spread spectrum process is converted into an analogue signal by the D/A converter 6, then, frequency-converted into a radio signal by the transmission circuit 7 to the transmitted to the serving base station form the antenna 1.

Next, channel control operations in the system configured as mentioned above will be explained.

Figure 3:
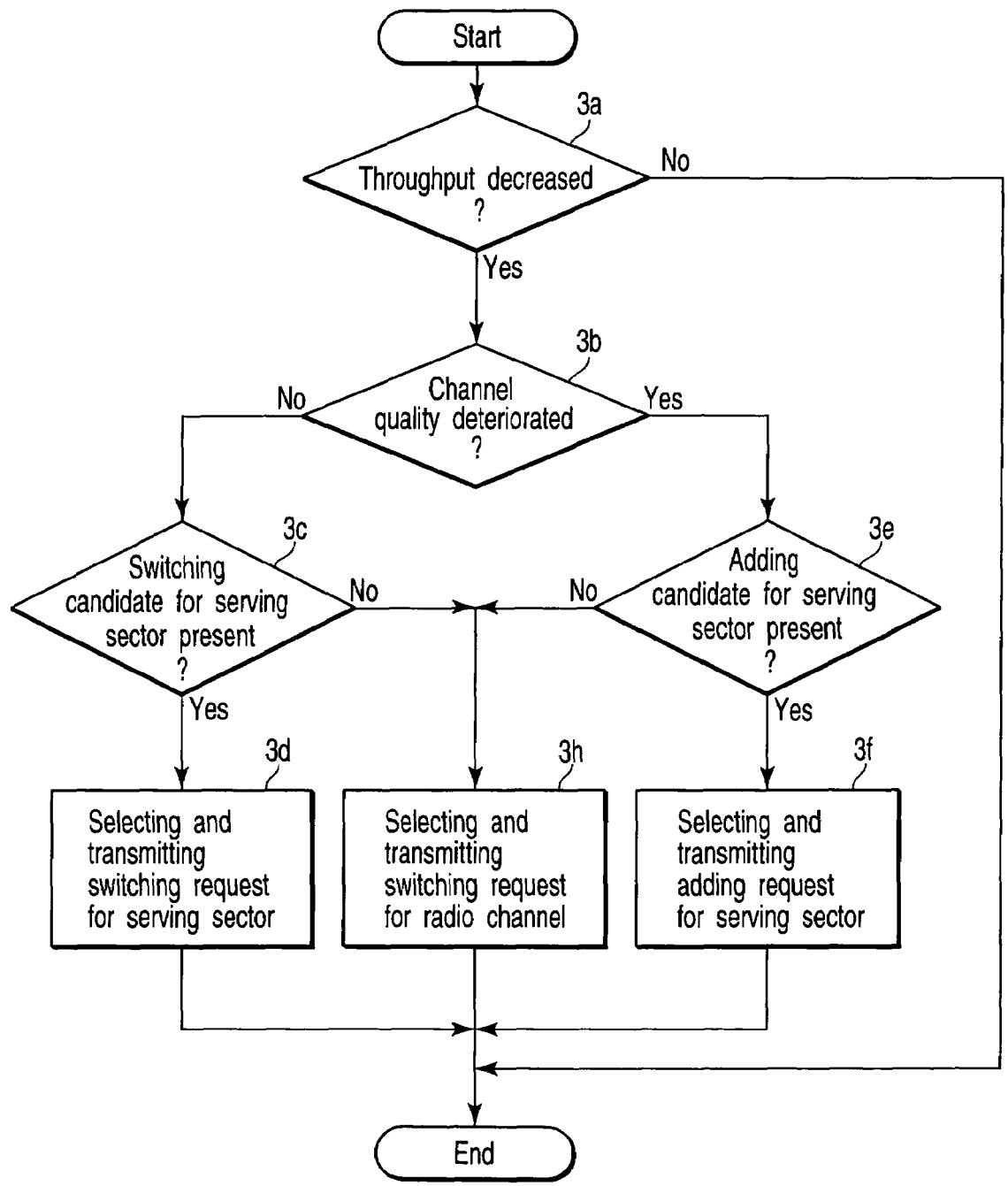
FIG. 3 is a flowchart showing procedures and contents of control of a request for a throughput improvement in the mobile communication terminal shown in FIG. 2.

FIG. 3 is a flowchart showing control procedures and contents in the mobile communication terminals MS 1-MS 5. Here, the channel control operations will be explained by taking the case as an example that the communication terminal MS 1 shown in FIG. 1 assumes the base station BS 1 as a serving station and receives the packet data from the serving base station BS 1 by using a downstream individual channel.

The control circuit 5 of the communication terminal MS 1 measures the channel quality of the downstream individual channel used for the radio communication between the serving base station BS 1 by means of the individual channel evaluation function 53. Then, the control circuit 5 selects the transmission format suitable for receiving the packet data under the corresponding channel quality, based on the measured channel quality of the individual channel by means of the downstream request generation function 56, and generates the downstream request rate information so as to request the selected transmission format to transmit it to the serving base station BS 1. The serving BS 1 transmits the packet data to the communication terminal MS 1 of the origin of the request in response to the downstream rate information transmitted from the communication terminal MS 1.

On the other hand, the communication terminal MS 1 monitors the deterioration in the throughput while conducting the receiving operation of the packet data (step 3a). This monitoring of the deterioration in the throughput is executed by evaluating the difference between the actually measured value and the predicted value of the throughput in the downstream individual channel and determining whether or not the transmission rate of the actually received data is smaller than the requested value by means of the rate detection function 54.

Here, it is assumed that the deterioration in the throughput is detected in such a state above described. Then, the control circuit 5 of the communication terminal MS 1 determines the factor of the throughput deterioration and selects the channel control information on the basis of the determination result by means of the determining function 55 as follows. That is, the control circuit 5 firstly compares the channel qualities of the individual channels detected by the evaluation function 53 with the threshold value (step 3b). Then, the control circuit 5 determines that the factor of the throughput deterioration is the deterioration in the channel qualities if the channel qualities are deteriorated up to the threshold value or less; otherwise, it determines that the factor is the concentration of the traffic.

Assuming that the factor of the throughput deterioration is the concentration of the traffic, the control circuit 5 changes to a step 3c. The control circuit 5 determines whether or not the base station to become the switching candidate for the serving center is present around (step 3c). This determination of the presence of the switching candidate is performed by evaluating the receiving quality of the common pilot signal stored into the sector table 52 and by determining whether or not the receiving quality of the pilot signal is enough to make channel connection. According to the result of the determination, if the base station to become the switching candidate of the serving sector is present, the control circuit 5 generates a request for switching the serving center and transmits it to a serving base station BS 1 as a request for channel control (step 3d).

When receiving the incoming switching request for the serving center from the communication terminal MS 1, the base station BS 1 selects a base station appropriate as a switching destination from a surrounding base station list reported from the communication terminal MS 1 in prescribed procedures. For example, in FIG. 1, the base station BS 2 is selected. Then, processing procedures to switch the serving base station to the base station BS 2 between the communication terminal MS 1 of the origin of the request and the base station BS 2 of the switching destination are executed. Accordingly, after this, user information (packet data) directed to the communication terminal MS 1 is transmitted toward the communication terminal MS 1 from the base station BS 2 newly made as a serving base station by the switching processing.

In contrast, if it is determined that the factor of the throughput deterioration is the deterioration in the channel qualities, the control circuit 5 changes to a step 3e and determines whether or not the base station to become the additional candidate of the serving center is present around. This determination is also conducted by evaluating the receiving quality of the common pilot signal of the surrounding base stations stored into the center table 52 in a way similar to the determination of the presence of the switching candidate described above. According to this determination, the control circuit 5 generates a request for adding a serving sector and transmits the request to the serving base station BS 1 as a request for channel control if the base station to become a serving sector is present as the result from this determination (step 3f).

When receiving the incoming request for adding the serving sector from the communication terminal MS 1, the serving base station BS 1 selects a base station appropriate for an adding object from the surrounding base station list reported in the prescribed procedures from the communication terminal MS 1.

For example, in FIG. 1, the base station BS 2 is selected. Then, processing procedures to add a serving base station between the communication terminal MS 1 of the origin of the request and the base station BS 2 of the switching destination are executed. Consequently, after this, user information directed to the communication terminal MS 1 is respectively transmitted thereto from the existing serving base station BS 1 and the base station BS 2 newly becomes a serving base station by the adding processing above described.

Assuming that a base station appropriate for the switching or the adding candidate is not present in the determining processing for the switching or the adding candidate for the serving sector, the control circuit 5 changes to a step 3h and determines the presence or absence of the individual channels possible to be switched in the same serving sector. Then, if the individual channel possible to be switched is found, the request for circuit switching is generated and it is transmitted to the serving base station BS 1.

When the request for the channel switching is transmitted from the communication terminal MS 1, the base station BS 1 releases the connection of the communication terminal MS 1 from the individual channel in current use in accordance with this request. Then, the base station BS 1 transmits user information to the communication terminal MS 1 by using the new selected vacant individual channel. At this time, it is possible for the base station BS 1 to select one of the radio channels owned by itself for a channel switching service and transmit the user information by temporarily using the selected radio channel. Thereby, the base station BS 1 can temporarily bypass a transmission path of the user information to another channel even when a base station appropriate for a switching object or an adding object is not present around. Accordingly, the base station BS 1 can assure the throughput of the communication terminal MS 1 and expect the operation stability of the whole of the system.

As described above, in this embodiment, the mobile communication terminal determines whether the factor of the deterioration is the deterioration in the channel quality or the deterioration in the concentration of the traffic when the deterioration in the throughput is detected. And then, if the factor of the deterioration in the throughput is the concentration of the traffic, the communication terminal determines whether or not the base station to become the switching candidate for the serving sector is present around, and requests to the serving base station so as to switch the serving station if such a base station is present. In contrast, if the factor of the deterioration in the throughput is the deterioration in the channel quality, the communication terminal determines whether or not the base station to be the adding candidate for the serving sector is present around, and requests to the serving base station so as to add the serving sector if such a base station is present. The communication terminal requests to the serving base station so as to switch the channel to another radio channel in the same serving sector when such a base station is not present around.

Consequently, when the deterioration in the throughput is generated in the communication terminals MS 1-MS 5, optimum throughput measures are respectively executed in the case that the factor of the deterioration is the deterioration in the channel qualities or the factor is the concentration of the traffic. Therefore, even when the concentration of the traffic is generated as well as when the channel qualities of the individual channels are deteriorated, high throughput can be maintained and a high-speed transmission service of content, etc., can be achieved.

The invention is not limited to the embodiment described above. For example, in the embodiment, the mobile communication terminal transmits the request information generated by the determining function 55 of the control circuit 5 to the serving base station from the switching/adding request generation function 57 by using the control channel. However, it is also possible for the communication terminal to transmit the request information generated by the determining function 55 from the downstream request generation function 56 by using the individual channel.

Figure 4:
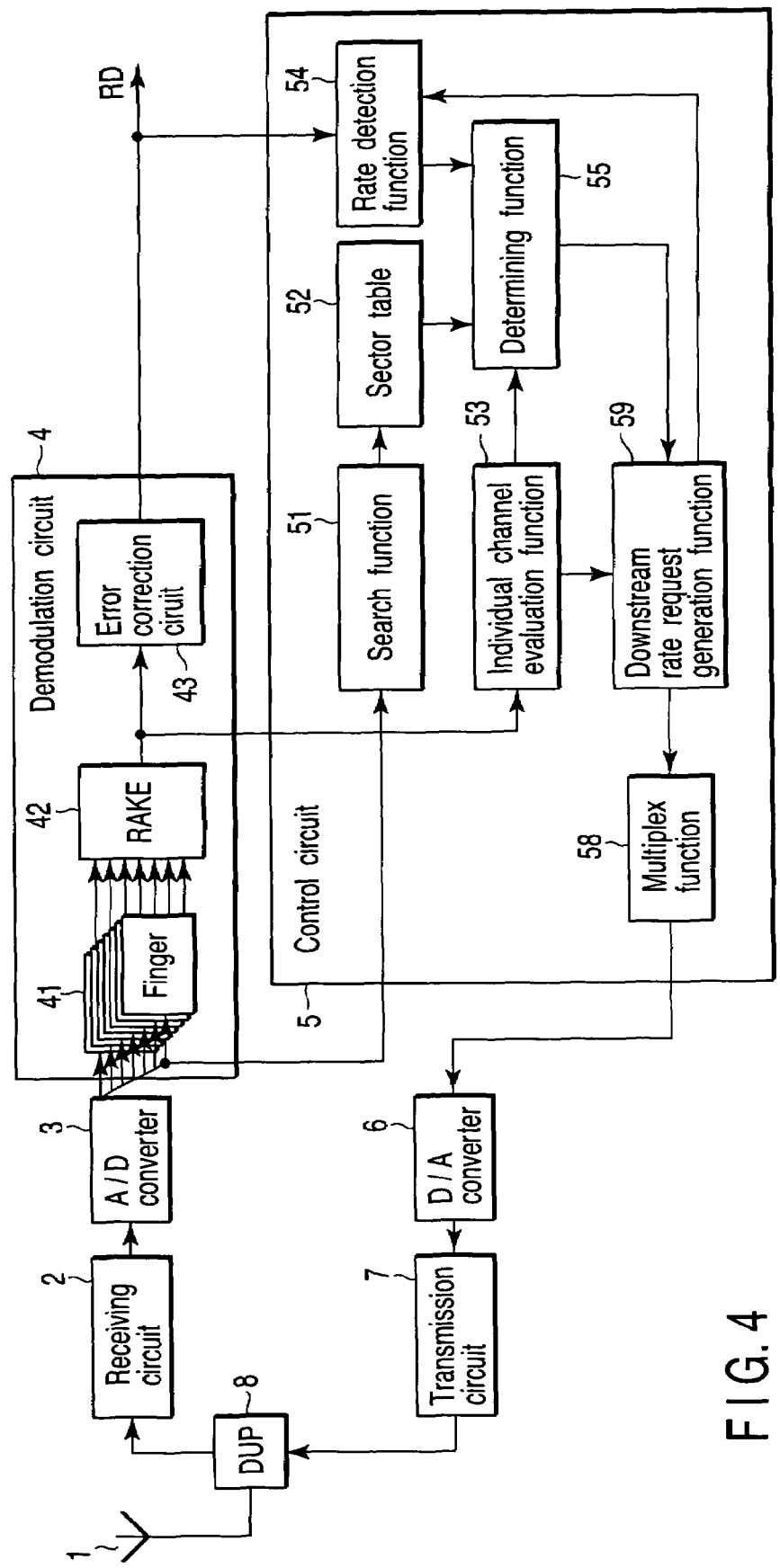
FIG. 4 is a circuit block diagram showing another embodiment of the mobile communication terminal regarding the invention.

FIG. 4 is the block diagram showing the configuration of the mobile communication terminal in another such embodiment. In FIG. 4, like reference numerals designate like components in FIG. 2 so as to eliminate the detailed explanation about the like components. In the control circuit 5, the switching request, the adding request and the channel switching request for the serving sector generated by the determining function 55 are input to a downstream rate request generation function 59.

The generation function 59 selects a transmission format appropriate for the transmission of radio data in the downstream direction under the corresponding channel quality on the basis of the channel qualities of individual channels measured by the individual channel evaluation function 53 and converts the selected transmission format into the format necessary to perform radio data transmission through the individual channel to output it to the multiplex function 58. When the determining function 54 outputs the switching request, the adding request or the channel switching request for the serving sector, the generation function 59 converts these requests into the format necessary to transmit them by using the individual channel and outputs the converted request information to the multiplex function 58.

Because of such a configuration, it becomes unnecessary to newly prepare a control channel to transmit the switching request, the adding request and the channel switching request for the serving sector, so that the system configuration can be simplified.

It is also acceptable for the communication terminals to set determination thresholds in association with classes of the communication terminals and determine the deterioration in the throughput by using the thresholds for each communication terminal when the communication terminals determine the deterioration in the throughput. For example, if different data communication fee systems are set for each class of the communication terminals, high determination thresholds are set to the communication terminals in the classes with the high data communication fee system set therein so as to be provided higher speed data communication services. In contrast, low determination thresholds are set to the communication terminals if the classes with the low data communication fee system set therein.

Furthermore, it is considerable for another technique to determine the factor of the deterioration in the throughput by using the difference between the actually measured values and the predicted values of the throughput. For example, the actually measured value and the predicted value are compared with each other. Then, when the frequency that the actually measured values become smaller than the predicted values exceeds a prescribed value, it is determined that the factor of the deterioration in the throughput at this time is the concentration of the traffic. As for another technique to determine the factor of the deterioration in the throughput, the combination of the evaluation results of the channel qualities of the individual channels mentioned above with the difference between the actually measured values and the predicted values of the throughput may be considered.

Although the embodiment has been explained by taking the case that the base stations BS 1-BS 6 respectively form one radio area E 1-E 6 as an example, the invention can be adopted to a system in which one base station forms a plurality of sectors. As for a configuration of a mobile communication terminal, a configuration of a control circuit and those functions, a variety of modifications can be achieved without departing from the spirit and the scope of the invention.

It follows that the invention is not limited to the embodiments above described as they are, the embodiments can be realized by modifying those components without departing the spirit and the scope thereof in execution phase. A variety of inventions can be formed by appropriately combining a plurality of components disclosed in the embodiments. For example, some components may be deleted among the all components disclosed in the embodiments. Moreover, the components over the different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system comprising:
   a plurality of base stations forming a plurality of radio areas and
   a mobile station making radio communication with the base stations in the plurality of radio areas
   the mobile station including:
   means for detecting deterioration in throughput of the radio communication in a state that the mobile station makes the radio communication with the base station;
   means for determining whether a factor of the deterioration in the throughput results from deterioration in channel qualities or from concentration of traffic when the deterioration in the throughput is detected; and
   means for transmitting a request for a throughput improvement, based on the result of the determination of the factor of the deterioration in the throughput, and
   the base stations including:
   means for receiving the request transmitted from the mobile station; and
   means for executing processing to improve the throughput of the radio communication between the mobile station in response to the received request.

2. A mobile communication terminal for making radio communication via a radio channel with at least one of a plurality of base stations respectively forming radio areas, comprising:
   means for detecting deterioration in throughput of the radio communication in a state that the mobile communication terminal makes the radio communication with the base station;
   means for determining whether a factor of the deterioration in the throughput results from deterioration in channel qualities or from concentration of traffic when the deterioration in the throughput is detected; and
   means for transmitting a request for a throughput improvement, based on the result of the determination of the factor of the deterioration in the throughput.

3. The mobile communication terminal according to claim 2, wherein the means for transmitting the request for the throughput improvement selects one request among a switching request for the radio area, an adding request for the radio area and a switching request for the radio channel in the same radio area and transmits the selected request to the base stations.

4. The mobile communication terminal according to claim 3, wherein the means for transmitting the request for the throughput improvement comprises:
   means for determining whether or not a base station to become a candidate for the radio area is present around; and
   means for selecting and transmitting the switching request for the radio area when it is determined that the factor of the deterioration in the throughput is the concentration of the traffic and that the base station to become the candidate for the radio area is present around.

5. The mobile communication terminal according to claim 3, wherein the means for transmitting the request for the throughput improvement comprises:
   means for determining whether or not a base station to become a candidate for the radio area is present around; and
   means for selecting and transmitting the adding request for the radio area when it is determined that the factor of the deterioration in the throughput is the deterioration in the channel qualities and that the base station to become the candidate for the radio area is present around.

6. The mobile communication terminal according to claim 3, wherein the means for transmitting the request for the throughput improvement comprises:
   means for determining whether or not a base station to become a candidate for the radio area is present around; and
   means for selecting and transmitting the switching request for the radio channel in the same radio area when it is determined that the factor of the deterioration in the throughput is the deterioration in the channel qualities or the concentration of the traffic and that the base station to become the candidate for the radio area is not present around.

7. A sector switching method, comprising:
   detecting deterioration in throughput of radio communication by a mobile communication terminal in a state that the radio communication is made between a base station and the mobile communication terminal;
   determining whether a factor of the deterioration in the throughput results from deterioration in channel qualities or from concentration of traffic when the deterioration in the throughput is detected;
   transmitting a request for a throughput improvement to the base station from the mobile communication terminal, based on the result of determination of the factor of the deterioration in the throughput; and
   executing processing to improve the throughput of the radio communication between the mobile communication terminal in response to the request for the throughput improvement transmitted from the mobile communication terminal.

8. The sector switching method according to claim 7, wherein the transmitting the request for the throughput improvement comprises:
   selecting one request among a switching request for a radio area, an adding request for a radio area, and a switching request for a radio channel in the same radio area, based on the result of determination of the factor of the deterioration in the throughput; and
   transmitting the selected request to the base station.

9. The sector switching method according to claim 8, wherein the transmitting the request for the throughput improvement comprises:
- determining whether or not a base station to become a candidate for switching the radio area is present around;
- selecting the switching request for the radio area when it is determined that the factor of the deterioration in the throughput is the concentration of the traffic and that the base station to become a switching candidate for the radio area is present around; and
- transmitting the selected switching request for the radio area to the base station.

10. The sector switching method according to claim 8, wherein the transmitting the request for the throughput improvement comprises:
- determining whether or not a base station to become an adding candidate for the radio area around;
- selecting the adding request for the radio area when it is determined that the factor of the deterioration in the throughput is the deterioration in the cannel qualities and that the base station to become an adding candidate for the radio area is present around; and
- transmitting the selected adding request for the radio area to the base station.

11. The sector switching method according to claim 8, wherein the transmitting the request for throughput improvement comprises:
- determining whether or not the base station to become a candidate for the radio area is present around;
- selecting a switching request for the radio channel in the same radio area when it is determined that the factor of the deterioration in the throughput is the deterioration in the channel qualities or the concentration of the traffic and that the base station to become the adding candidate for the radio area is not present around; and
- transmitting the selected switching request for the radio channel to the base station.

* * * * *